United States Patent [19]

Heyes et al.

[11] Patent Number: 5,093,208
[45] Date of Patent: Mar. 3, 1992

[54] LAMINATED METAL SHEET

[75] Inventors: Peter J. Heyes, Wantage; Nicholas J. Middleton, Highworth, both of England

[73] Assignee: CMB Foodcan plc, Worcester, England

[21] Appl. No.: 642,566

[22] Filed: Jan. 18, 1991

Related U.S. Application Data

[63] Continuation of Ser. No. 377,837, filed as PCT/GB88/00852, Oct. 12, 1988, abandoned.

[30] Foreign Application Priority Data

Oct. 15, 1987 [GB] United Kingdom ............ 8724239

[51] Int. Cl.$^5$ .............. B32B 15/08; B32B 31/20
[52] U.S. Cl. .................. 428/623; 428/626; 428/458; 428/483; 156/309.9; 156/322; 220/457
[58] Field of Search ............ 428/623, 626, 629, 632, 428/458, 483; 220/454, 455, 457; 156/272.4, 309.9, 322, 324.4

[56] References Cited

U.S. PATENT DOCUMENTS

| | | | |
|---|---|---|---|
| 3,647,592 | 3/1972 | Woodberry | 156/272.2 |
| 4,143,790 | 3/1979 | Ueno et al. | 428/458 |
| 4,322,003 | 3/1982 | Long | 206/525 |
| 4,330,587 | 5/1982 | Woodbrey | 428/215 |
| 4,362,775 | 12/1982 | Yabe et al. | 428/458 |
| 4,614,691 | 9/1986 | Inui et al. | 428/623 |

FOREIGN PATENT DOCUMENTS

| | | | |
|---|---|---|---|
| 82717 | 5/1983 | Japan | 156/272.2 |
| 61-149340A | 7/1986 | Japan | |

Primary Examiner—R. Dean
Assistant Examiner—George Wyszomierski
Attorney, Agent, or Firm—Burns, Doane, Swecker & Mathis

[57] ABSTRACT

A laminated metal sheet, the metal sheet having adhered on at least one major surface thereof a film of a non-crystalline polyester, and a process for the preparation thereof. The laminated metal sheet is particularly useful for forming into drawn and wall ironed (DWI) cans. The laminate is also useful for forming other non-retorted packaging components.

32 Claims, 2 Drawing Sheets

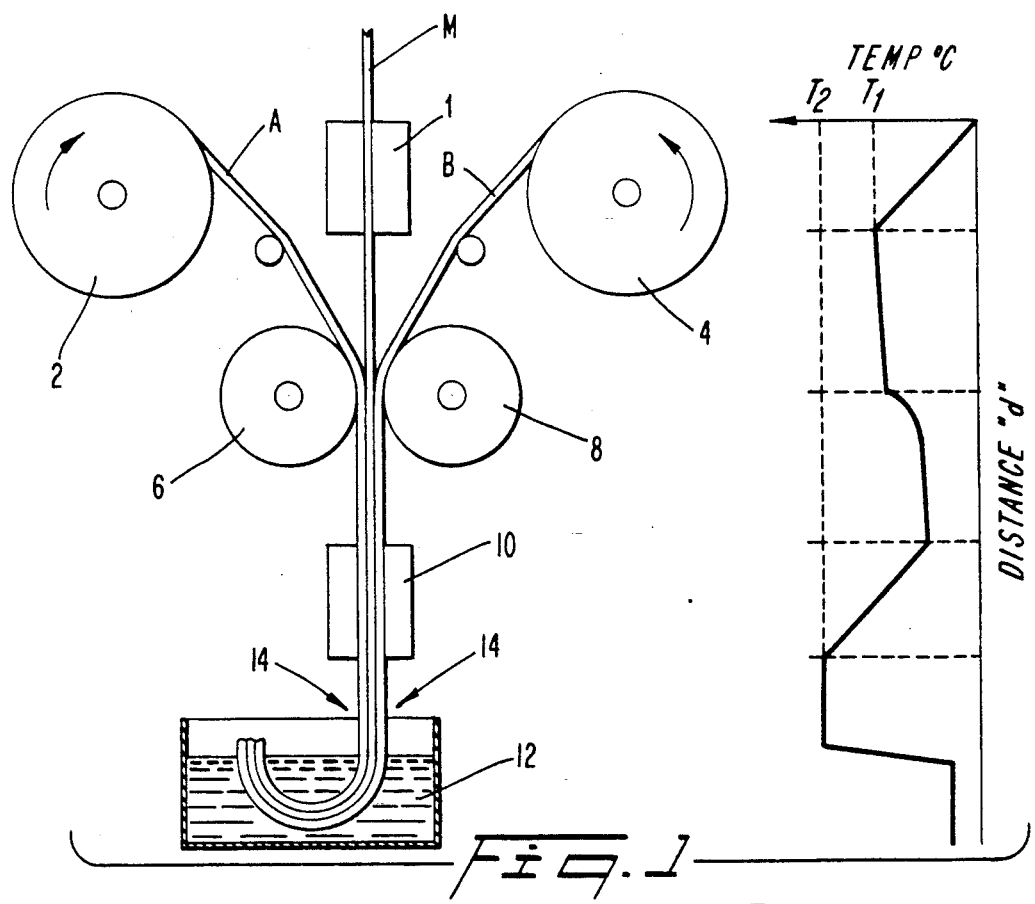
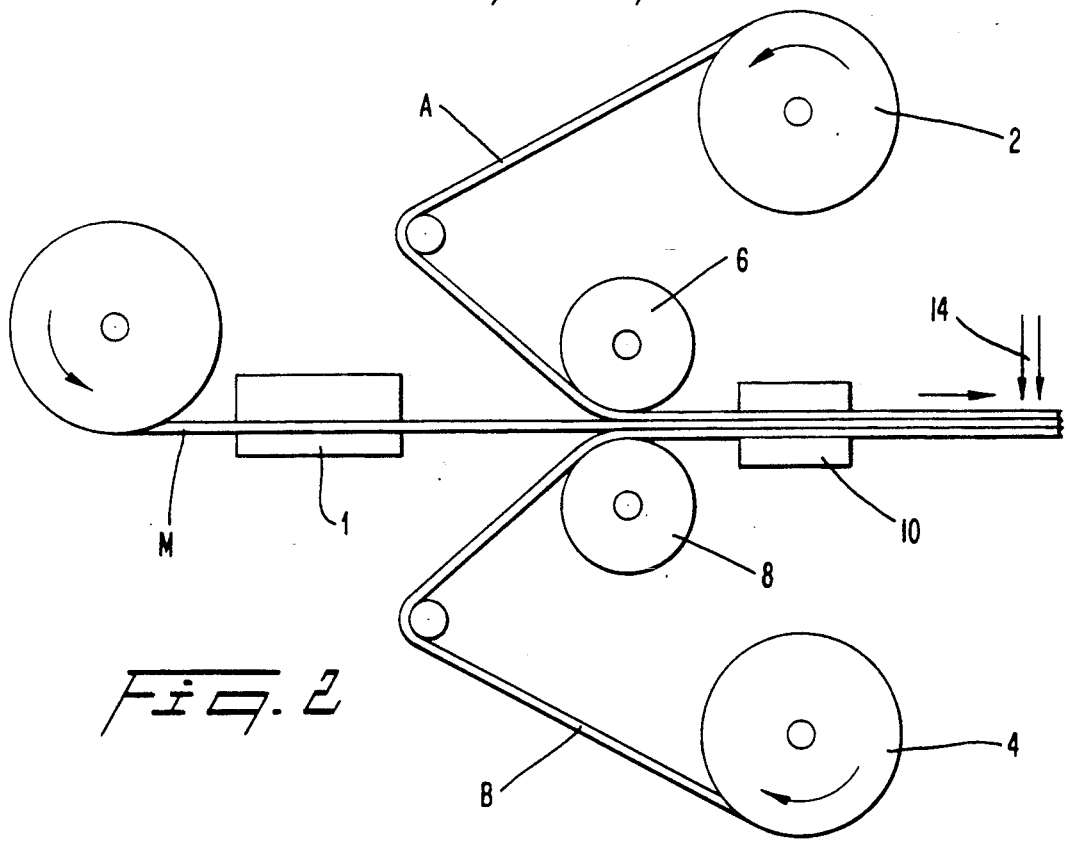

LAMINATED METAL SHEET

This application is a continuation of application Ser. No. 07/377,837, filed as PCT/GB88/00852, Oct. 12, 1988, now abandoned.

The present invention relates to laminated metal sheet and to a process for producing such laminated metal sheet.

Lamination of polymer materials to metal sheet such as metal strip is a well known and well documented technique. The resultant laminates have many applications including use for the manufacture of drawn and wall-ironed cans, (also referred to as DWI cans).

It is known to use steel or aluminium coated with polyolefin coatings as a stock for preparing DWI cans. Such materials are described, for example, in U.S. Pat. No. 4,096,815 and British Patent 2003415; as far as we are aware, such materials have not found commercial application.

We have found that polyolefin coatings do not form as well as thermoplastic polyesters. The lamination of polyester coatings to steel and aluminium is described, for example, in British Patents 2123746 and 2164899. However, these patents emphasize that retention of some biaxial orientation in the polyester coating is necessary for adequate container shelf life. We have found that laminates of the types described in these patents are not capable of being subjected to the forming operations which are required to prepare deep drawn or DWI cans without severe disruption of the polyester coatings occurring. The retained orientation in the coatings described in British Patents 21223746 or 2164899 limits the elongation at break value of the coatings to relatively low values which are exceeded in DWI can forming operations. Such laminates are therefore unsuitable for forming deep drawn or DWI cans.

We have now found that a laminate of a metal sheet having adhered thereto a thermoplastic polyester which is in substantially non-crystalline (or amorphous) form survives DWI operations and retains acceptable metal coverage. Such coatings out-perform polyolefin coatings in DWI can forming, and retain better continuity and protection.

Accordingly, in one aspect, the present invention provides a laminated metal sheet, one or both surfaces of the metal sheet having adhered directly thereto a film of a non-crystalline polyester.

The non-crystalline polyester (also referred to herein as an amorphous polyester) should be substantially free from orientation as determined by x-ray diffraction or density measurements.

A method for measuring crystallinity by x-ray diffraction is given in GB 1566422. Crystallinity can be measured from density measurements as follows.

$V_c$ = Volume fraction crystallinity
$V_c = (P - P_a) \cdot (P - P_c)^{-1}$
P = density of polyester
$P_a$ = density of amorphous polyester
$P_c$ = density of crystalline polyester.

The density measurements can be made in zinc chloride/water solution or n-heptane/carbon tetrachloride using a density column.

Typically the non-crystalline polyester is a polyethylene terephthalate (PET) or a polybutylene terephthalate (PBT). The PET materials preferably have an intrinsic viscosity between 0.5 and 1.1 as measured in o-chlorophenol at 25° C. and a concentration of 5 gm per liter.

The non-crystalline polyester film laminated to the metal sheet is obtained by laminating to the metal sheet a film comprising a polyester, with the conditions under which the lamination is performed being such that during lamination the polyester film or films in the metal/polymer laminate is or are converted into non-crystalline (or amorphous) form.

Preferably each of the major surfaces of the metal sheet carries a film of non-crystalline polyester as defined above. However, the scope of the invention encompasses metal sheet carrying a non-crystalline polyester on one major surface with a layer of a different thermoplastic polymer film on the other major surface of the metal sheet.

The metal substrate to which the polymer films are applied, typically in the form of metal strip, is generally steel or aluminium or alloys thereof, typically a steel or aluminium based product used in the packaging industry.

The gauge range is typically 0.05 mm to 0.4 mm for steel and 0.02 mm to 0.4 mm for aluminium; generally 0.25 mm to 0.35 mm for steel and aluminium DWI cans.

The steel may be coated with tin, preferably passivated by conventional chromic treatments, or alternatively may be in the form of nickel or zinc plated steel, blackplate or phosphated blackplate, which is preferably chromate rinsed after phosphating.

The preferred steel finish is electrolytically chromium coated steel (ECCS) with a dual layer of chromium metal and chromium oxide. With such steels, the chromium metal and chromium oxide levels can vary widely. Typically, the chromium metal content ranges from 0.01 to 0.20 gm/m$^2$, while the chromium oxide ranges from 0.005 to 0.05 gm/m$^2$. The ECCS is commonly derived from deposition systems containing either sulphur containing or fluorine containing catalysts.

The aluminium which is used is preferably a 3004 type alloy with either an as-rolled ("mill") finish, a cleaned and optionally oiled finish, or a cleaned and chromate or chromate-phosphate treated, optionally oiled, finish. As an example, Alocrom A272 is a proprietary chromate-phosphate treatment system for aluminium strip.

A number of different types of polyester film can be used to prepare the metal polymer laminate. Typical polyester materials suitable for use in preparing the metal polymer laminate of the invention are:

(i) cast thermoplastic polyester such as polyethylene terephthalate or polybutylene terephthalate.
(ii) biaxially oriented polyester films having a semi-crystalline structure, typically biaxially oriented polyethylene terephthalate.
(iii) cast co-extruded composite polyester film.
(iv) a composite co-extruded polyester film comprising:
    (A1) an inner layer of a substantially non-crystalline linear polyester having a softening point below 200° C. and a melting point below 250° C. but above 150° C., and
    (A2) an outer layer of a biaxially oriented linear polyester having a crystallinity greater than 30%.

When using a co-extruded polyester film, it is preferred to use a film having a thinner inner layer (A1) and a thicker outer layer (A2).

Typically, the outer layer (A2) is a PET homopolymer. Its intrinsic viscosity is preferably between 0.5 and 1.1, more preferably 0.6 to 0.7, for biaxially oriented film and greater than 0.9 for cast film.

The thinner inner layer (A1) is typically a substantially non-crystalline linear copolyester of 80% ethylene terephthalate and 20% ethylene isophthalate. Alternatively the inner layer is a substantially non-crystalline copolyester derived from terephthalic acid and two dihydric alcohols such as ethylene glycol and cyclohexane-dimethanol.

If desired the polyester layers can be pigmented, for example with anti-blocking agents such as synthetic silica or pigments giving a coloured or white appearance, for example titanium dioxide. It is particularly preferred to pigment layer A2 with titanium dioxide for the outside surface of a beverage can formed from the laminate.

Preferably the coextruded film's outer layer (A2) is polyethylene terephthalate. Preferably the inner amorphous layer (A1) is a linear copolyester, for example an amorphous copolymer of approximately 80% ethylene terephthlate and approximately 20% ethyleneisophthalate. Copolyesters of terephthalic acid and two alcohols, for example ethylene glycol and cyclohexane-dimethanol, are also suitable for use as the inner amorphous layer (A1).

Where the coextruded film is biaxially oriented, the crystallinity of the outer crystalline layer (A2) is typically 50%, but can be reduced to 40% or less if the biaxial orientation of the crystalline polymer is reduced.

Biaxially oriented film may be formed by stretching the amorphous extruded polymer in the forward direction at temperatures above the glass transition temperature of the polymer by a factor of 2.2 to 3.8 and similarly in the transverse direction by 2.2 to 4.2.

The laminated metal sheet of the invention is prepared by a process which comprises adhering directly to one or both major surfaces of the metal sheet a film comprising a polyester, the lamination conditions being such that during lamination the polyester film or films in the metal/polymer laminate is or are converted into non-crystalline or amorphous form.

In one preferred process of preparing the metal polymer laminates in accordance with the invention polyester monolayer film or films are adhered to the metal sheet by heating the metal sheet to a temperature (T1) above the melting point of the polyester films, the temperature (T1) being such that during lamination of the polyester films to the metal sheet, the outer surfaces of the polyester films remain below their melting points, laminating the film or films to the metal sheet, reheating by indirect means the laminate to a temperature (T2) above the melting points of the polyester films and after holding at these elevated temperatures, quenching rapidly the polyester coated metal to a temperature below the glass transition points of the polyester coating resins.

In an alternative preferred process, the polyester film or films are composite films (A) comprising an inner layer (A1) and an outer layer (A2), and the composite polyester films are simultaneously adhered to the metal sheet by a process which comprises
(i) heating the metal sheet to a temperature (T1) above the softening point of the polyester inner layer (A1) but below the melting point of the outer layer (A2),
(ii) laminating the film or films to the metal sheet,
(iii) reheating by indirect means the laminate so that the metal sheet reaches a temperature above the melting point of the or each polyester film, and
(iv) after holding above these elevated temperatures, quenching rapidly the polyester coated metal to a temperature below the glass transition points of the polyester coating resins.

The said composite polyester films are preferably coextruded polyester films comprising
(A1) an inner layer of substantially non-crystalline linear polyester having a softening point below 200° C. and a melting point below 250° C. but above 150° C.,
(A2) an outer layer of polyester having a melting point above 220° C.,
the polyesters having intrinsic viscosities of 0.5 to 1.1 measured in o-chlorophenol at 25° C. and a concentration of 5 gm per liter.

The metal/polymer laminate is preferably re-heated downstream of the lamination nip by use of induction heating means, but infrared heating may also be used. The temperature to which the metal sheet should be heated prior to lamination depends both on the thickness of the films to be laminated and also on the chemical nature of the said films. The uncoated metal may be treated by direct or indirect means for example, induction, infrared, hot air or hot rollers.

Temperatures of 140° C. to 350° C. are suitable for coextruded biaxially oriented PET film, 130° C. to 250° C. for cast coextruded polyester film, 260° C. to 350° C. for biaxially oriented PET monofilm of high crystallinity or 200° C. to 300° C. for PET film of low crystallinity and above 180° C. for cast PBT monofilm.

The temperatures to be used on reheating the laminate downstream of the lamination nip typically are above 270° C. for polyethylene terephthalate and 240° C. for polybutylene terephthalate. Commercial operations generally demand a dwell time of approximately two seconds only between the reheating operation and quenching. The quenching is uniform and rapid and can be accomplished by curtains of cold water directed at the strip. To prevent polyester crystallisation, the laminate should be quenched from temperatures above about 190° C.; to prevent blistering the coating should be quenched from below the melting point.

The laminates of this invention are particularly suited for forming into drawn and wall ironed cans (DWI). Conventional DWI operations manufacture cans from metal sheet free from organic coatings by the following steps:
1—lubricate the tinplated or aluminium sheet
2—cut a disc of material from the metal sheet
3—place the disc on a circular die set and hold in place with a cylindrical blankholder ring
4—advance a punch through the die set whilst controlling the sheet movement with the blankholder
5—form a shallow cup from the metal by forcing the punch through the die until all the metal passes through the die and remove the punch.
6—transfer the cup to a punch of diameter equal to the diameter of the container desired.
7—redraw the cup and force the punch and cup through a set of concentric rings each with a progressively smaller internal diameter and such that the clearance between the punch and die is less than the thickness of the cup material.
8—the cup wall is ironed and elongated.
9—restrain the formed can and remove the punch.
10—trim excess material from the can wall top.
11—was the can to remove lubricant and in the case of aluminium, etch away metal detritus.
12—rinse and dry the can.

Generally after washing, an aluminium beverage can undergoes the following operations;

13—Chemically treat the surface
14—Rinse and dry in a conveyor oven
15—Coat externally with a basecoat
16—Cure basecoat
17—Apply printed decoration.
18—Cure the decoration.
19—Apply an internal coating (by spraying).
20—Cure the internal coating.
21—Neck and flange the can, reducing the neck diameter to a value compatible with an end closure and creating a flange for double seaming.

Alternatively, if a selected external basecoat is applied, the conventional printing operation can be replaced by a dye sublimation printing process as such as described in GB 2101530, 2145971, 2141382, 2010529, 2141972 and 2147264. After the basecoat is cured, a paper label impregnated with a sublimable dye is wrapped around the can and held firmly to itself with a small amount of adhesive at the paper overlap. The can is passed through an oven at a temperature above the sublimation point of the dye and the print is transferred without the use of solvent. The label can be stripped with air jets, leaving a printed can with excellent print quality. This is a solvent-free process, substantially free from atmospheric emissions.

Drawn and wall-ironed cans (DWI cans) made from the laminate materials of the invention can be decorated and printed with conventional solvent based inks after the DWI can is formed.

Thermoset polyester coatings will readily accept sublimed dyes and a process for transferring dyes from paper labels to DWI can is commercially established. We have found that thermoplastic polyester coatings on metal sheet will accept sublimed dyes. However a high quality decoration from a paper label is only achieved if there is retained orientation in the PET coating. If the coating is amorphous, either because it has been melted in the lamination process or was derived from an unoriented film, the paper label sticks to the coating during the sublimation stage and marrs the decoration.

The sublimation from paper label is carried out by establishing intimate contact between paper and coating and heating to temperatures above 160° C. and usually up to 220° C. Under these conditions non-oriented PET is above its glass transition (Tg), relatively soft and will tack to paper. If the outer part, at least, of the coating retains biaxial orientation, the paper does not stick to the polyester during dye sublimation. The outer, oriented material in contact with the paper has a modified thermal behaviour and its effective glass transition is not encountered during dye sublimation.

The problems outlined in dye transfer into amorphous coatings would make dye sublimation of amorphous polyester coated DWI cans seem unlikely. Surprisingly we have found that DWI cans formed from amorphous polyester coated laminates in accordance with the present invention can be successfully decorated by dye sublimation using standard labels and sublimation conditions.

The label application must preferably be modified slightly to avoid label contact with approximately the bottom 2 mm of the can wall, as denoted "d" in FIG. 7a of the accompanying drawings. If this procedure is followed the paper will not stick to or marr the coating. Generally speaking, an amorphous coating of polyester will stick to paper if it is in contact above its Tg. However, the can forming operation introduces orientation into the polyester coatings of the laminates of the present invention and thereby raises the effective Tg. The amount of induced orientation is relatively small even at the can wall top and very different for internal and external coatings, so it is surprising that the beneficial effect which prevents paper sticking is so pronounced.

The laminates described in this invention can surprisingly be manufactured into DWI cans whilst retaining excellent coating integrity and adhesion. Furthermore the coated containers can be decorated by conventional printing or by a dye sublimation process.

The laminates of the present invention can also be used to manufacture other packaging components, particularly non-retorted packaging components. Typical examples of such other components are:

Draw redraw cans for beverage products for example 54 mm diameter by 70 mm height cans made from 0.21 mm ECCS, 350 N/mm$^2$.

Scored easy open beverage can ends for example 65 mm steel or aluminium ends.

Integral neck oblong ends for oblong containers.

Paint can end components such as ring, ends and caps.

Aerosol end components such as cones and domes.

The principal advantages of this invention are:

elimination of all solvent emissions is made practicable and environmental protection is improved.

large can washers can be replaced by small rinsers, saving the washer chemical costs.

energy consumption is reduced by cutting down the number of oven passes necessary to complete the can.

external base protection is improved.

the internal protection of complex base profiles is improved.

the use of can making lubricant can be eliminated.

the size and cost of a factory installation and the operation labour costs can be reduced.

external print quality is excellent.

Throughout this specification, intrinsic viscosities are measured at 25° C. in o-chlorophenol solutions at a concentration of 5 g/l.

The present invention will now be described in further detail, by way of example only, with reference to the following Examples, and with reference to the following drawings, in which:

FIGS. 1 and 2 show diagrams of apparatus suitable for performing the process of the present invention;

EXAMPLES 1 to 13

Figure 3:
FIG. 3 shows a section taken through a laminate in accordance with the invention and comprising monolayered polymer films (A) laminated to a metal strip (M)
Figure 4:
FIG. 4 shows a section taken through a laminate similar to that of FIG. 3 but having a composite multilayered polymer film (A) laminated to a metal strip (M)
Figure 5:
FIG. 5 shows a section taken through a laminate similar to that of FIG. 4 but containing an additional film (B) of thermoplastic polymer laminated to the opposite side of the metal strip (M)
Figure 6:
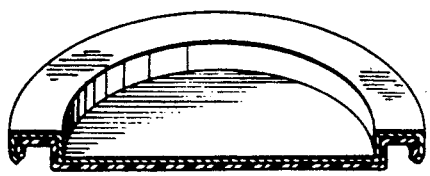
FIG. 6 shows a can end formed from a laminate in accordance with the invention.

Polymer/metal/polymer laminates were prepared by a lamination process performed in apparatus as illustrated schematically in FIG. 1 or FIG. 2 of the accompanying drawings. A metal sheet M was pre-heated by infrared or induction heating to an appropriate temperature $T_1$ by a heater 1. Temperature $T_1$ is usually within the range 140° and 350° C. Polyester films A and B were fed from feed rolls 2 and 4 and laminated to the opposite sides of the pre-heated metal sheet between lamination rolls 6, 8, typically having a diameter of 100-400 mm. Lamination was generally performed using a nip force of 200-400N per meter between the lamination rolls.

In the lamination nip, intimate and uniform, wrinkle-free contact between the metal sheet and the polymer films is established. Downstream of the lamination rolls the resultant laminate is re-heated, preferably by use of an induction heater 10 or by infrared heating, to a laminate temperature $T_2$ at which the polymer films (A) will interact with and become strongly bound to the metal sheet. Temperature $T_2$ is usually within the range 220 ° and 270° C. for PBT and 260° to 300° C. for PET. The metal polymer laminate is held at temperature $T_2$ or a temperature below $T_2$ for a short period of time, usually no more than 2 seconds, and is then rapidly and uniformly quenched with water to a temperature below the glass transition point of the polyester in the films, for example about 80° C. for PET. Quenching can be performed in any conventional manner, but typically can be performed by passing the laminate through a tank 12 of water as shown in FIG. 1 or by passing the laminate through curtain 14 of quenching water as shown in FIG. 1 and FIG. 2.

In general, the process illustrated in FIG. 1 with the lamination being performed in a vertical mode is preferred. Vertical movement of the metal strip through the lamination stage tends to allow a higher quench rate and gives better and more uniform quenching.

FIG. 1 also shows a schematic diagram of a typical temperature profile which would be found in the process illustrated in the apparatus of FIG. 1. Thus, laminates were prepared from the materials given in Table I by preheating the metal strip by infrared or induction heating, passing the metal strip and polymer films into a pair of nip rolls and laminating both major metal surfaces simultaneously with the polymer films. The resultant laminate was reheated by infrared or induction, held above 200° C. for two seconds and quenched rapidly and uniformly with cold water.

Table II sets out a number of Examples showing the results obtained when preparing such laminates using various metal temperatures ($T_1$) in the pre-lamination stage and various reheating temperatures ($T_2$) in the post-lamination stage.

TABLE I

| LAMINATE TYPE | Film to be laminated to one side of metal sheet (Thickness) | Metal Sheet (Thickness) | Film to be laminated to other side of metal sheet (Thickness) |
| --- | --- | --- | --- |
| A | PET composite - Type I (18 microns) | Al 3004 alloy (0.317 mm) | PET composite - Type I (18 microns) |
| B | PET monofilm (12 microns) | Al 3004 alloy (0.317 mm) | PET monofilm (12 microns) |
| C | PET composite - Type III (15 microns) | Al 3004 alloy (0.317 mm) | PET composite - Type III (15 microns) |
| D | PET composite - Type III (15 microns) | Al 3004 alloy (0.317 mm) | PET composite - Type I (18 microns) |
| E | PET composite - Type III (15 microns) | Al 3004 alloy (0.317 mm) | PET composite - Type II (25 microns) |
| F | PET monofilm (25 microns) | Al 3004 alloy (0.317 mm) | PET composite - Type I (18 microns) |
| G | PET composite - Type III (15 microns) | Al 3004 alloy Mill Finish (0.317 mm) | PET composite - Type III (15 microns) |
| H | PP composite - Type I (25 microns) | Al 3004 alloy (0.317 mm) | PP composite - Type II (40 microns) |
| I | PET composite - Type III (15 microns) | Al 3004 alloy (0.317 mm) | PP composite - Type I (25 microns) |
| J | PET composite - Type III (15 microns) | ECCS 350N/mm² (0.31 mm) | PET composite - Type III (15 microns) |

KEY TO TABLE I
PET composite - Type I: Co-extruded cast PET composite film having: (i) inner layer which is a copolyester of terephthalic acid with ethylene glycol and cyclohexane dimethanol, and (ii) outer layer which is a PET homopolymer with an intrinsic viscosity greater than 0.9.
PET composite - Type II: As PET composite - Type I but additionally incorporating TiO2 pigment in outer layer.
PET composite - Type III: Co-extruded biaxially oriented PET composite film having: (i) inner layer which is a copolyester of terephthalic acid and isophthalic acid with ethylene glycol, and (ii) outer layer which is a PET homopolymer with an intrinsic viscosity of approx. 0.6 to 0.7.
PET monofilm: Monofilm of co-extruded biaxially oriented PET having intrinsic viscosity of approx. 0.6 to 0.7.
PBT monofilm: Monofilm of cast polybutylene terephthalate (PBT).
PP composite - Type I: Cast co-extruded polypropylene composite film having: (i) inner layer of maleic anhydride graft modified polypropylene, and (ii) outer layer of polypropylene.
PP composite - Type II: As PP composite - Type I but additionally having outer layer pigmented with TiO2 and synthetic silica.
Al 3004 Alloy: Aluminium alloy 3004 having a chromate-phosphate surface treatment (Alocrom A272).
Al 3004 Alloy-Mill Finish: Aluminium alloy 3004 uncleaned and untreated after cold rolling.

TABLE II

| EXAMPLE | LAMINATE MATERIALS | METAL TEMPERATURE ($T_1$) | REHEATING TEMPERATURE ($T_2$) | XRD ($\theta = 13°$) Ratio | Peak | Formability |
| --- | --- | --- | --- | --- | --- | --- |
| 1 | A | 180 | 240 | — | 0 | Excellent |
| 2 | A | 180 | 280 | — | 0 | Excellent |
| 3 | B | 300 | 280 | 0 | 0 | Excellent |
| 4 | B | 280 | 240 | 0.29 | 2000 | Poor |

TABLE II-continued

| EXAMPLE | LAMINATE MATERIALS | METAL TEMPERATURE ($T_1$) | REHEATING TEMPERATURE ($T_2$) | XRD ($\theta = 13°$) Ratio | Peak | Formability |
|---|---|---|---|---|---|---|
| 5 | C | 220 | 280 | — | 0 | Excellent |
| 6 | C | 220 | 240 | 0.29 | 2000 | Poor |
| 7 | D | 200 | 280 | — | 0 | Excellent |
| 8 | E | 200 | 260 | — | 0 | Excellent |
| 9 | F | 200 | 260 | | | Excellent |
| 10 | G | 220 | 280 | — | 0 | Excellent |
| 11 | H | 160 | 270 | | | Poor |
| 12 | I | 150 | 270 | — | 0 | Poor |
| 13 | J | 220 | 280 | — | 0 | Good |
| 14 | J | 220 | 240 | 0.29 | 2000 | Poor |

The laminate formability was assessed by coating coverage after draw and wall ironing the laminate in two stages:

Stage 1: a cup (height 35 mm, diameter 86 mm) was drawn from the laminate, suitably lubricated.

Stage 2: a can body (diameter 65 mm, height 130 mm) was formed by redrawing and wall ironing.

After forming, the cans were rinsed in water and dried. Coating coverage was assessed by immersion in acidified copper sulphate for two minutes and visually inspecting for copper deposits or the "enamel rating" technique using a sodium chloride solution, a voltage of 6.3V and measuring current in milliamps.

The influence of lamination temperatures on the polyester coating structure and formability of the laminate was assessed by x-ray diffraction. In this technique, the film or laminate is placed in an X-ray diffractometer. Count rates are measured when the flat samples are exposed to a beam of substantially monochromatic x-rays using an appropriate detector. The sample and detector are rotated in line with respect to the beam, maintaining the geometry such that the angle between the sample and beam ($\theta$) and beam and detector remain in the ratio 1:2, as in a normal powder diffraction scan. This data generates information on planes parallel to the sample surface.

In biaxially oriented PET, the (1,0,0) plane gives a high count rate at $\theta = 13°$ C. but in amorphous PET the peak is absent. The ratio of $\theta = 13°$ peak heights for laminate and film is related to the amount of retained orientation in the laminate. Our results are presented as the ratio of peak heights and the laminated PET coating peak height for $\theta = 13$. Laminate material B laminated in accordance with the teaching of GB 2123746 to retain orientation (see Example 4) had poor formability and failed to make cans without metal breaking or severe coating disruption. However, when laminate material B was processed to eliminate orientation and crystallinity, as in Example 3, it had excellent formability and afforded good protection after forming.

Similarly, biaxially oriented coextruded laminate materials C and J also gave good formability if amorphous, and poor formability if they retained orientation in the laminate (compare Example 5 with Example 6 and Example 13 with Example 14).

Cast, unoriented PET or PBT coatings were effective, provided they were laminated to produce an amorphous and not a crystalline condition. A crystalline condition is produced for example by slow cooling from the reheated stage.

Examples 11 and 12 show that laminates formed from polypropylene materials of the type described in GB 2003415 exhibited poor formability. Such laminates were found to give metal failure in can forming.

The extent of re-orientation of the polyester coatings was assessed by examining a drawn and wall-ironed can made with the laminate and the conditions of Example 5. The following results were obtained:

| Sample Location | XRD ($\theta = 13°$) Peak |
|---|---|
| Can base - internal coating | <50 |
| Can base - external coating | <50 |
| Can wall top - internal coating | 100 |
| Can wall top - external coating | 450 |

The XRD data confirms that the laminated sheet had amorphous coatings and shows that the upper can wall is slightly oriented, more so for the can outside coating.

The lower 2 mm of the can wall external coating were not significantly affected by can forming and remained essentially amorphous.

Figure 7A:
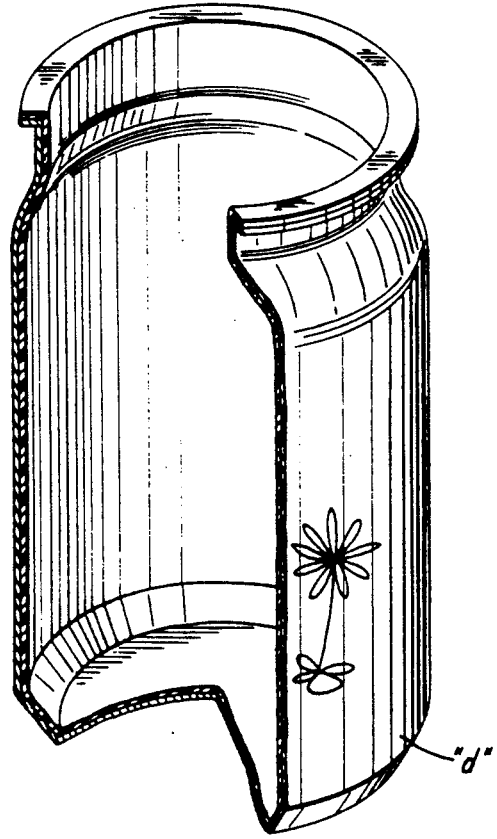
FIGS. 7a and 7b respectively show a drawn and wall-ironed can and a draw-redraw can formed from a laminate in accordance with the invention.
Figure 7B:
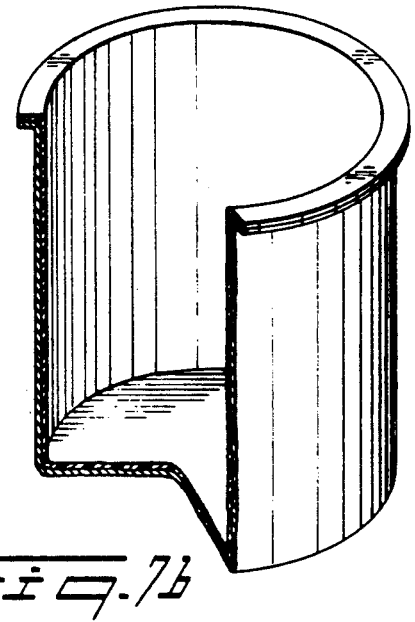

The external walls of DWI cans formed from the laminates of Examples 1 to 13 were decorated by a conventional dye sublimation process. The quality of the resultant decoration was found to be excellent, provided the label was not in contact with the lower 2 mm of the can wall, region "d" of FIG. 7a.

We claim:

1. A process for making a laminate of metal and non-crystalline polyester, characterized by the steps of:
   (i) providing a sheet of metal and monolayer film of biaxially-oriented polyester having a semi-crystalline structure,
   (ii) heating the sheet of metal to a temperature $T_1$ above the melting point of the film,
   (iii) applying the film to the sheet under pressure and under conditions such that the outer surface of the film remains below its melting point to form an initial laminate,
   (iv) heating the initial laminate by indirect means so that the film is raised to a temperature $T_2$ above its melting point, and after holding at such elevated temperature,
   (v) quenching rapidly the heated initial laminate to a temperature below the glass transition point of the polyester to form the aforesaid laminate of metal and non-crystalline polyester, by passage through a curtain of water.

2. A process according to claim 1 wherein the biaxially oriented polyester film is formed by stretching amorphous extruded polymer by a factor between 2.2 and 3.8 along its length and between 2.2 and 4.2 transversely, before application to the heated sheet of metal.

3. A process according to claim 1 wherein, in step (iv) the initial laminate is heated by induction.

4. A process according to claim 1 wherein the biaxially oriented polyester is selected from the group comprising polyethylene terephthalate and polybutylene terephthalate.

5. A process according to claim 4 wherein the sheet of metal is heated in step (ii) to a temperature $T_1$ in a range 140° C. to 350° C.

6. A process according to claim 1 wherein the polyester film contains titanium dioxide pigment.

7. A process for making a seamless container body from a laminate of metal and non-crystalline polyester made by a process according to claim 1, characterized by the further step of drawing from the laminate a cup having an end wall and a side wall upstanding from the periphery of the end wall and covered by said film of polyester.

8. A process according to claim 7 comprising a further step of forming a can body by redrawing the cup to reduce the diameter of the cup and increase the height of the side wall.

9. A process according to claim 8 comprising the further step of wall ironing the can body.

10. A process according to claim 9 further comprising the step of decorating the external wall of the drawn and wall ironed can by dye sublimation.

11. A process according to claim 9, further comprising the steps of:
washing and drying the can body; and
decorating the external wall of the drawn and wall ironed can by dye sublimation from a paper label, such that the label contacts only the ironed portions of the can wall.

12. A process for making a laminate of metal and non-crystalline polyester characterized by the steps of:
(a) providing a composite film comprising an inner layer of polyester (A1) and an outer layer of polyester (A2) in which at least one of said polyester layers is a biaxially oriented polyester having a semi-crystalline structure;
(b) heating the sheet metal to a temperature $T_1$ above the softening point of the inner layer;
(c) applying the composite film to the heated sheet metal under pressure and under conditions such that the outer surface layer remains below its melting point to make an initial laminate;
(d) heating the initial laminate by indirect means to a temperature $T_2$ above the melting point of both the inner and outer layers to make a laminate; and after holding at such elevated temperature
(e) quenching the laminate rapidly to a temperature below the glass transition points of the polyesters to achieve a laminate of sheet metal and polyesters in which the film in the laminate is non-crystalline.

13. A process according to claim 12, wherein the sheet of metal is heated to a temperature $T_1$, in the range 140° to 350°.

14. A process according to claim 12 wherein the biaxially oriented film is formed by stretching an amorphous extruded polymer by a factor in a range 2.2 to 3.8 along its length and stretched transversely by a factor in a range 2.2 to 4.2, before application to the heated sheet of metal.

15. A process according to claim 12 wherein in step (d) the laminate is heated by induction.

16. A process according to claim 12 characterized in that in step (e) the laminate is quenched by passage through a curtain of cold water.

17. A process according to claim 12 wherein the inner layer is a polyester chosen from a group consisting of a copolyester of terephthalic acid and two dihydric alcohols and a copolyester of 80% terephthalic acid and 20% isophthalic acid with ethylene glycol.

18. A process according to claim 12 wherein the inner layer is thinner than the outer layer.

19. A process according to claim 12 wherein the outer layer is a polyethylene terephthalate.

20. A process according to claim 19 wherein the polyethylene terephthalate is biaxially oriented and has a crystallinity greater than 30%.

21. A process according to claim 12 wherein the outer layer of polyester includes titanium dioxide pigment.

22. A process for making a seamless container body from a laminate of metal and a composite film comprising at least two layers of polyester made by a process according to claim 12 characterized by the further step of drawing from the laminate a cup having an end wall and a side wall upstanding from the periphery of the end wall and covered by said composite film of polyesters.

23. A process according to claim 22 comprising a further step of forming a can body by redrawing the cup to reduce the diameter of the cup and increase the height of the side wall.

24. A process according to claim 23, comprising the further step of wall ironing the can body.

25. A process according to claim 24 further comprising the step of decorating the external wall of the drawn and wall ironed can by dye sublimation.

26. A process according to claim 24, further comprising the steps of:
washing and drying the can body; and
decorating the external wall of the drawn and wall ironed can by dye sublimation from a paper label, such that the label contacts only the ironed portions of the can wall.

27. A laminated metal sheet comprising sheet metal, one or both major surfaces having adhered directly thereto a composite polyester film, wherein the composite polyester film comprises:
(a) an inner polyester layer of single polyester having a softening point below 200° C. and a melting point below 250° C. but above 150° C.; and
(b) an outer polyester layer having a melting point above 220° C. and formed from a biaxially oriented polyester having a semi-crystalline structure; wherein:
(c) the polyester film is substantially non-crystalline; and
(d) the polyester film has an intrinsic viscosity between 0.5 and 1.1;
such that the laminated metal sheet is suitable for making drawn and wall ironed cans.

28. A laminated metal sheet according to claim 27, characterized in that the composite polyester film comprises a polyester or copolyester selected from the group consisting of: polyethylene terephthalate; a copolyester made from ethylene glycol, terephthalic acid and a second dibasic acid; and a copolyester made from terephthalic acid, ethylene glycol and a second dihydric alcohol.

29. A laminated metal sheet according to claim 28, wherein the inner polyester layer comprises a copolyester of ethylene glycol and approximately 80 mole % terephthalic acid and approximately 20 mole % isophthalic acid.

30. A laminated metal sheet according to claim 29 characterized in that the composite film is a coextrusion which is thermally bonded to the metal.

31. A laminated metal sheet according to claim 30, characterized in that the outer layer of polyester is polyethylene terephthalate.

32. A laminated metal sheet comprising sheet metal, one or both major surfaces having adhered directly thereto a composite polyester film, characterized in that the composite polyester film is substantially non-crystalline and comprises an inner polyester layer and an outer polyester layer, wherein the outer polyester layer has a higher melting temperature than the inner polyester layer and at least one of the layers has been formed from a biaxially oriented polyester having a semi-crystalline structure.

* * * * *